United States Patent
Miller et al.

(10) Patent No.: US 8,880,118 B1
(45) Date of Patent: *Nov. 4, 2014

(54) DETERMINING PRESENCE STATUS USING MOTION DETECTION

(71) Applicant: Sprint Communications Company L.P., Overland Park, KS (US)

(72) Inventors: Kristen E. Miller, Chicago, IL (US); Harry H. Lai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,155

(22) Filed: Jan. 16, 2013

Related U.S. Application Data

(63) Continuation of application No. 13/186,594, filed on Jul. 20, 2011, now Pat. No. 8,369,888, which is a continuation of application No. 12/266,867, filed on Nov. 7, 2008, now Pat. No. 8,103,304.

(51) Int. Cl.
*H04M 1/00* (2006.01)
*H04W 4/16* (2009.01)

(52) U.S. Cl.
CPC ............................ *H04W 4/16* (2013.01)
USPC .................. 455/550.1; 600/509; 702/130

(58) Field of Classification Search
USPC ......... 455/550.1; 340/540; 345/473; 600/509
See application file for complete search history.

(56) References Cited

U.S. PATENT DOCUMENTS

| | | | | |
|---|---|---|---|---|
| 6,461,312 | B1 * | 10/2002 | Ganshorn | 600/587 |
| 2010/0309209 | A1 * | 12/2010 | Hodgins et al. | 345/473 |

* cited by examiner

*Primary Examiner* — Phuoc H Doan

(57) ABSTRACT

Determining a presence status associated with a user of a mobile communications device allows for presence information to be provided to network elements and device clients. Presence status information includes information that indicates whether a user is likely available via the mobile communications device. Acceleration data associated with the mobile device is collected and analyzed to determine whether a human profile is indicated. Presence status information is generated based at least on whether the human profile is indicated.

20 Claims, 7 Drawing Sheets

DETERMINING PRESENCE STATUS USING MOTION DETECTION

CROSS-REFERENCE TO RELATED APPLICATIONS

This application is a continuation of U.S. application Ser. No. 13/186,594, filed Jul. 20, 2011, entitled "Determining Presence Status Using Motion Detection," which is a continuation of U.S. application Ser. No. 12/266,867, filed Nov. 7, 2008, entitled "Determining Presence Status Using Heat And Motion Detection," granted U.S. Pat. No. 8,103,304, the entirety of which is incorporated by reference herein.

SUMMARY

Embodiments of the invention are defined by the claims below, not this summary. A high-level overview of embodiments of the invention is provided here for that reason, to provide an overview of the disclosure.

In a first illustrative aspect, a presence server provides presence information associated with a user of a mobile communications device. The presence server includes one or more processing devices and computer-readable media. The media have embodied thereon computer-useable instructions for causing the presence server to receive heat information associated with the mobile device, receive motion information associated with the mobile device, and analyze the heat and motion information to determine whether a human profile is indicated. The human profile includes a characterization of heat and motion information that indicates whether the user is available via the mobile device. The presence server also stores presence status information based on whether a human profile is indicated.

In another illustrative aspect, computer-readable media have computer-executable instructions embodied thereon for performing a method of providing presence information associated with a user of a mobile communications device. The method includes receiving, at a network element, a first temperature associated with a first location near an outside surface of the mobile communications device. A second temperature associated with a second location near an outside surface of the mobile communications device is received at the network element. A difference is calculated between the first temperature and the second temperature. The difference is compared to a predetermined range that corresponds to a human profile, where the human profile comprises a range of temperature differences that suggest that a human being is in close proximity to the mobile communications device. When the difference is within the predetermined range, presence status information is stored that indicates that the user is available via the mobile communications device.

In yet another illustrative aspect, a presence server provides presence information associated with a user of a mobile communications device. The presence server is configured to receive acceleration data associated with the mobile device and analyze the acceleration data to determine whether a human profile is indicated. The human profile comprises a characterization of motion information that indicates that the user is available via the mobile device. The presence server is further configured to fit a model to at least a portion of the acceleration data, determine whether the model includes a baseline component, and determine whether the first set of accelerations includes a deviation from the baseline component. The presence server also stores presence status information that is based at least on whether the human profile is indicated.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for providing presence information associated with a user of a mobile communications device. By determining a presence status based on an analysis of heat and motion data captured by sensors in the mobile device, embodiments of the present invention allow users of mobile communications devices to obtain improved presence information associated with their contacts and allow for more accurate presence information to be provided to network elements and device clients.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
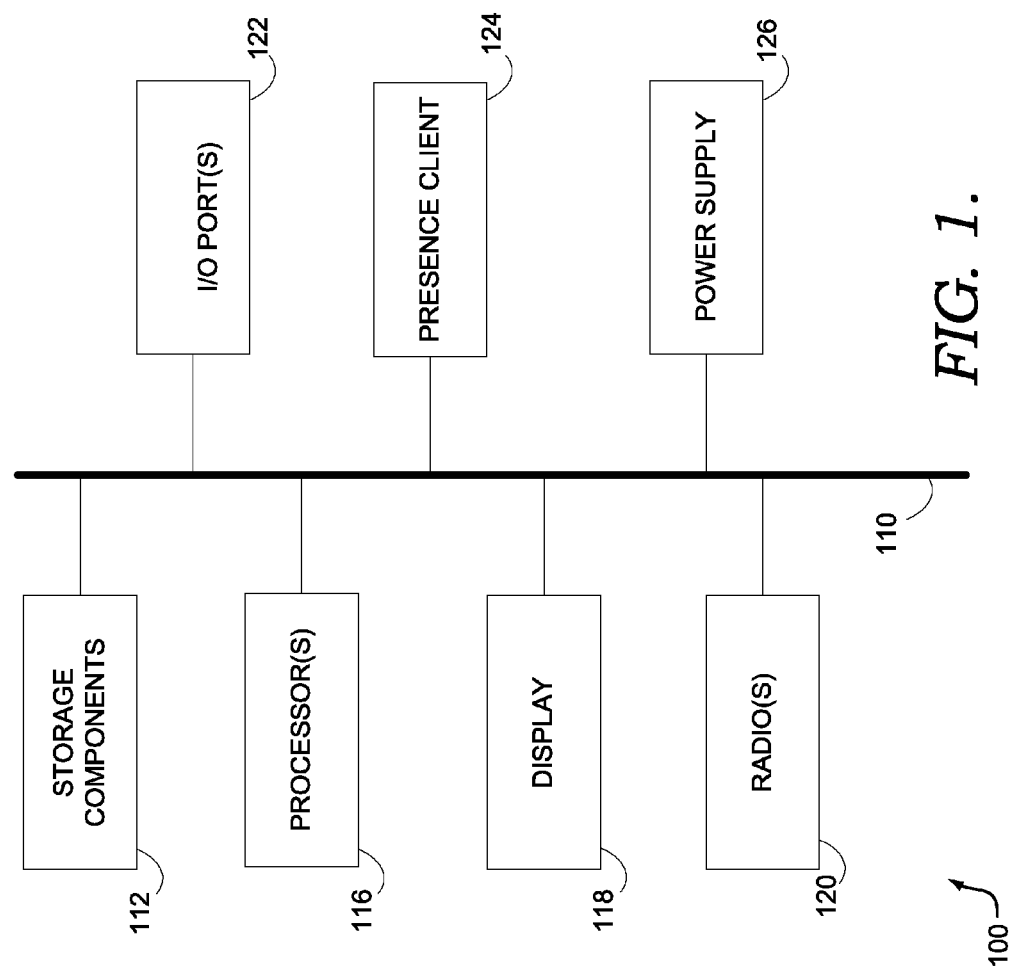
FIG. 1 is a block diagram showing an exemplary mobile communications device in accordance with embodiments of the present invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as mobile communications device 100. Mobile device 100 is but one example of a suitable computing environment and is not intended to suggest any limitation as to the scope of use or functionality of the invention. Neither should the mobile device 100 be interpreted as having any dependency or requirement relating to any one or combination of components illustrated.

As shown, a bus 110 couples, directly or indirectly, the following illustrative components: a storage component 112, a processor 116, a display 118, a radio 120, input/output ports 122, a presence client 124, and a power supply 126.

Storage components 112 may take the form of the aforementioned computer-readable media. As with all of the illustrative components of FIG. 1, although we refer to them sometimes in the singular, that should not be read so as to imply that we mean only a single of each of the components is contemplated within the scope of our invention. To the contrary, by way of example, storage component or components 112 may actually be composed of constituent storage components located within mobile device 100.

Processors 116 facilitate a flow of information among all or a portion of the components shown in FIG. 1 as well as computer-usable instructions that help facilitate various aspects of the present invention. For example, in one embodiment, an operating system of mobile device 100 also helps coordinate various functional aspects of the present invention. Processors 116 operate in connection with running such an operating system.

Radios 120 facilitate the communication of wireless communication signals to and from mobile device 100. Illustrative protocols that can be utilized in connection with an embodiment of the present invention include CDMA, TDMA, GSM, GPRS, EV-DO, WiFi, WiMax, and the like. The radios facilitate wireless communications between the device and a national or even global telecommunications network.

Input/output ports 122 provide a way for mobile device 100 to interact with other peripheral components. Illustrative input/output ports include an ear-piece or headphone jack, a USB port, an infrared port, and the like. Different input/output ports could be provided as is needed to facilitate communication of other peripheral components.

Presence client 124 facilitates communicating presence information associated with a user of mobile device 100 to other clients within mobile device 100 as well as to any number of various nodes on a mobile network. In some embodiments, the presence information can also be communicated directly to other mobile communications devices or computing devices. In an embodiment, presence client 124 interacts with a presence server located on a network such that presence information can be distributed to interested users over the network.

Power supply 126 may also take on a variety of forms ranging from a battery to a charging mechanism to other forms of power sources that serve to provide power to mobile device 100.

The selected components of mobile device 100 are meant to be illustrative in nature, and the various lower-level details of the components are not elaborated on so as to not obscure the present invention. Clearly, some of the components may be absent in some embodiments of the present invention, and additional components not shown may also be part of mobile device 100. Attempting to show all of the various components of mobile device 100 would obscure certain novel aspects, and we will refrain from such elaboration at least for the sake of brevity.

Figure 2:
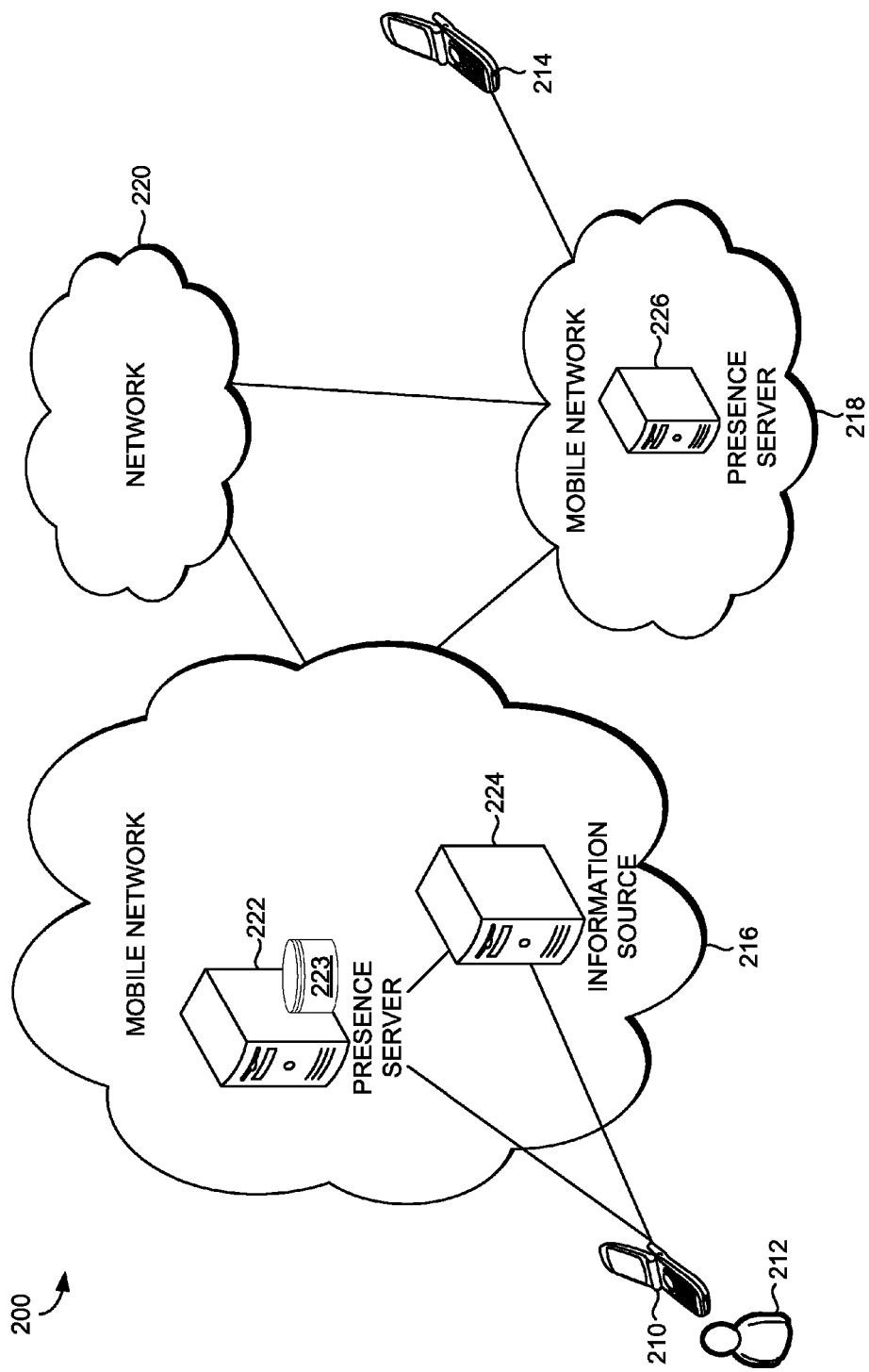
FIG. 2 is a block diagram showing an exemplary network environment suitable for implementing embodiments of the present invention.

Turning now to FIG. 2, a block diagram is shown that illustrates an exemplary network environment 200 in accordance with an embodiment of the present invention. Network environment 200 includes mobile devices 210, and 214, mobile networks 216 and 218, and network 220. As illustrated in FIG. 2, mobile networks 216 and 218 include presence servers 222 and 226. Mobile network 216 also can, as illustrated, include an information source 224, which can be any type of server or other network node that can provide data associated with presence information to presence server 222. Network environment 200 is merely an example of one suitable network environment and is not intended to suggest any limitation as to the scope of use or functionality of the present invention. Neither should network environment 200 be interpreted as having any dependency or requirement related to any single component or combination of components illustrated therein.

It will be understood by those skilled in the art that each of these elements of the network environment 200 is also scalable. That is, for example, network environment 200 can include a large number of mobile devices. Additionally, for example, presence server 222 may actually include a number of presence servers, operating in parallel with a load balancer such that large amounts of traffic may be managed. Of course, the same is true with any of the other elements of the exemplary network environment 200 such as, for example, information source 224, presence server 226, and any other network element or server that may be employed in an embodiment of the present invention. Any or all of these servers may be implemented using any number of server modules, devices, machines, and the like.

Mobile networks 216 and 218 can be any of the various types of mobile networks known in the art and can support, for example, any of the protocols mentioned above with respect to FIG. 1. Network 220 can be a local area network (LAN), a mobile network (MN), or a wide area network (WAN) such as the Internet. Although lines of communication are shown in FIG. 2, these connections are intended to be illustrative only and should not be read to limit the configuration of connections in various implementations of embodiments of the present invention.

Mobile devices 210 and 214 are mobile communications devices such as, for example, the mobile communications device 100 described above with reference to FIG. 1. Mobile devices 210 and 214 are capable of communicating with one another, either directly or by way of any combination of the various networks 216, 218, and 220. Mobile device 210 is capable of determining presence information associated with its user 212. In some embodiments, mobile device 210 includes a sensor or sensors adapted to capture heat and motion data associated with mobile device 210. According to embodiments of the present invention, mobile device 210 also includes components such as program modules that analyze collected data to determine presence information and in other embodiments collected data is analyzed externally to the mobile device 210 such as, for example, by a presence server 222. Mobile device 210 can also communicate presence information across mobile network 216.

As illustrated in FIG. 2, mobile network 216 includes a presence server 222 and an information source 224, which can be a server, computing device, or other network component capable of providing presence information to presence server 222. Presence server 222 and information source 224 can be implemented on any number of types of computing devices. In an embodiment, presence server 222 and information source 224 are each implemented on a separate machine. In other embodiments, presence server 222 and information source 224 are implemented on a single machine or a distributed processing system using several interconnected machines. In a further embodiment, combinations of the components 222 and 224 can be implemented on any number of machines and according to any number of various combinations.

The components of mobile network 216 are also scalable. That is, in embodiments of the present invention, there can be varying numbers of components. For instance, in one embodiment, mobile network 216 includes one of each of presence server 222 and information source 224. In another embodiment, mobile network 216 can include many of each of the components 222 and 224. In a further embodiment, presence server 222 and information source 224 can be maintained outside of mobile network 216. Any number of configurations that operate to provide communications with presence capabilities as described below can be suitable for implementing embodiments of the present invention.

Presence server 222 provides presence services throughout mobile network 216 such as, for example, maintaining presence status information for mobile device 210, receiving presence status updates from mobile device 210 or from other network components such as information source 224, providing presence status information to mobile device 210 and other devices or networks 218, 220, registering presence clients such as presence client 124 discussed above with respect to FIG. 1, and the like. Those having ordinary skill in the art will understand that there are many different possible configurations for presence server 222, and all of these are considered to be within the ambit of the present invention.

As indicated above, presence server 222 maintains presence status information associated with mobile device 210. Presence status information, as used herein, includes information that indicates whether a user is likely available via the user's mobile device 210. It should be appreciated that presence status information will usually indicate the possibility of user availability rather than the actuality of user availability due to the inability to determine user availability with complete accuracy without actually observing the user to be available. To that end, however, novel aspects of the present invention offer an improvement in the accuracy of that determination over the prior art.

Presence status information can be represented in a variety of manners, using any number of formats. In one embodiment, for example, presence status information consists of an identifier that is associated with a description of user availability via the user's mobile device 210. Typical examples of descriptions of user availability include single-word descriptions such as "online," "home," "work," "away," "busy," and the like. Additionally, presence status can be determined using embodiments of the present invention for any of the types of communication of which mobile device 210 is capable. Examples of communication types for which presence status can be determined include voice, text, email, SMS, and the like. Presence server 222 stores presence status information in a storage module 223, which can be a database, a virtual storage model, a file system, or the like. In an embodiment, presence server 222 maintains a user or device profile associated with each registered user and/or mobile device 210. The user or device profile includes an identifier that corresponds to the user or device, corresponding account information, corresponding presence status information, and the like.

According to an embodiment of the present invention, presence server 222 determines the presence status associated with a user or device 210 based on presence information. In another embodiment, presence status is determined by mobile device 210 and communicated, as presence status information, to presence server 222. Presence information can be provided by any number of sources such as, for example, mobile device 210, information source 224, user 212, or other network components not illustrated in FIG. 2. In an embodiment, presence information includes raw data such as, for example, temperature differential data, motion data, data indicating whether mobile device 210 is registered, data reflecting recent use of mobile device 210, and the like.

In another embodiment, presence information includes processed data. Processed data is data that results from an analysis of raw data or other processed data. For example, processed data can include an aggregation of data, a conclusion derived from analyzing data, a mathematical model generated from data, and the like. In an embodiment, processed data includes information that describes whether a human profile is indicated by data. Data indicates a human profile when the data, (e.g., a characterization of heat and motion information) suggests that the user 212 is available via the mobile device 210. To determine whether data suggests that the user 212 is available via the mobile device 210, data is subjected to rules, heuristics, filters, pattern matching algorithms, and the like.

In one embodiment, presence server 222 maintains a presence status corresponding to the user 212 or mobile device 210 until presence server 222 receives presence information indicating that the presence status has (or should be) changed. As shown in FIG. 2, presence server 222 can store presence status information in a storage module 223. In another embodiment, presence server 222 maintains presence status information temporarily and replaces the presence status information periodically. Presence server 222 can periodically ping mobile device 210 and/or information source 224 to determine if updated presence information associated with mobile device 210 is available. In some embodiments, mobile device 210 and/or information source 224 push presence information to presence server 222. In turn, presence server 222 is adapted to provide presence status information associated with mobile device 210 to other devices, networks, network components and the like. For instance, in an embodiment, presence server 222 provides presence information associated with mobile device 210 or user 212 to mobile device 214 via network 220 and mobile network 218.

As illustrated in FIG. 2, mobile network 218 also includes a presence server 226. Presence server 226 can perform similar services with respect to mobile device 214 and mobile network 218 that presence server 222 performs with respect to mobile device 210 and mobile network 216. Additionally, in embodiments, presence server 226 can receive presence status information associated with mobile device 210 and provide that presence status information to mobile device 214. Likewise, presence server 222 can receive presence status information associated with mobile device 214 from presence server 226 and provide that presence status information to mobile device 210. In other embodiments, presence servers 222 and 226 broadcast presence status information.

Figure 3:
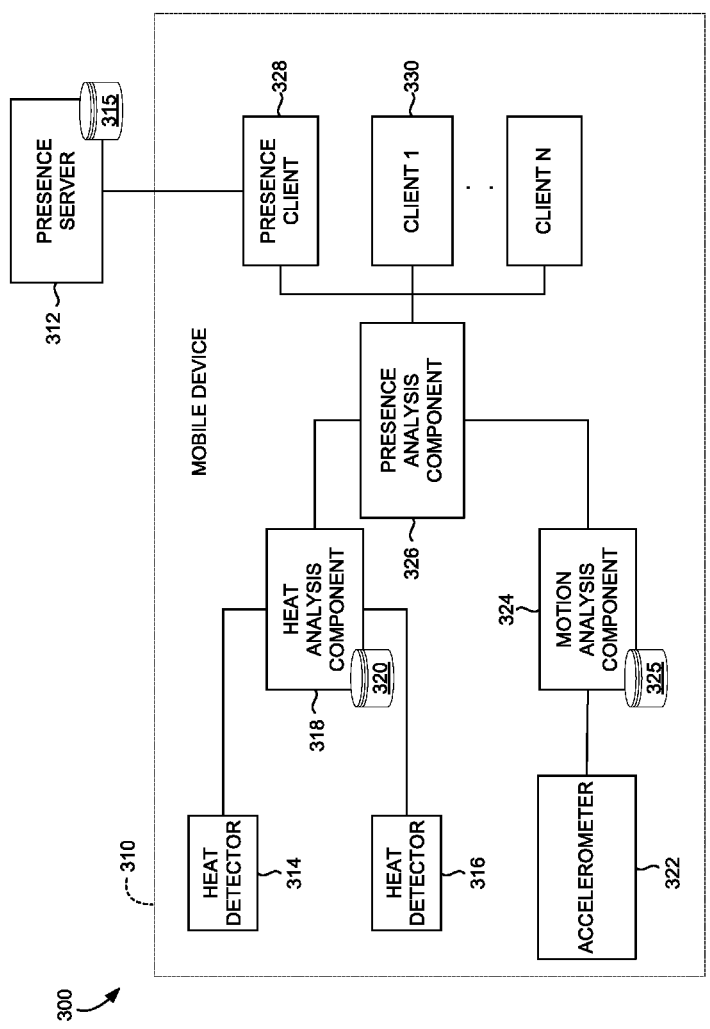
FIG. 3 is a block diagram illustrating an exemplary mobile presence system suitable for implementation of embodiments of the present invention

Turning now to FIG. 3, a block diagram is shown that illustrates an exemplary mobile presence system 300 suitable for implementation of embodiments of the present invention. Mobile presence system 300 includes a mobile device 310 and a presence server 312. As described above with respect to FIG. 1, presence server 312 can be located on a network such as a mobile network, an enterprise network, a LAN, a WAN, or other type of network. Mobile device 310 can communicate with presence server 312 in various ways such as, for example, directly, or via a network or networks. As described above with respect to FIG. 2, mobile device 310 provides presence information, presence status information, and/or other data to presence server 312, which stores presence status information in storage module 315. Additionally, mobile device 310 can receive presence status information associated with other mobile devices from presence server 312.

Mobile device 310 is merely an example of one suitable mobile device and is not intended to suggest any limitation as to the scope of use or functionality of the present invention. Neither should mobile device 310 be interpreted as having any dependency or requirement related to any single component or combination of components illustrated therein. For example, in some embodiments, heat analysis component 318 and motion analysis component 324 are integrated with presence analysis component 326, where heat analysis component 318 and motion analysis component 324 are program modules that can be executed by presence component 326. In other embodiments, heat analysis component 318 and motion analysis component 324 may be absent entirely, leaving presence analysis component 326 to perform all of the required analysis. In further embodiments, mobile device 310 includes additional sensors or components for generating, collecting, or analyzing presence information.

As illustrated in FIG. 3, mobile device 310 includes heat detectors 314 and 316, a heat analysis component 318, accelerometer 322, motion analysis component 324, presence analysis component 326, and various clients 328, 330, one of which is a presence client 328. Heat detectors 314 and 316 provide heat information to heat analysis component 318, which analyzes the heat information. Accelerometer 322 provides motion information to motion analysis component 324. As discussed in greater detail below, heat analysis component 318 and motion analysis component 324 can provide varying degrees and types of analysis, depending on the assignment of processing functions to the presence analysis component 326 and the presence server 312. Presence analysis component 326 references heat information and motion information. Using that information, presence analysis component 326 determines whether a human profile is indicated.

Heat detectors 314 and 316 can be any kind of sensor capable of obtaining a measurement of temperature at a location near the surface of the mobile device 310. For instance, heat detectors 314 and 316 can include thermometers, thermistors, resistance temperature detectors, and the like. In various embodiments, there may be more than two heat detectors 314 and 316. For instance, in an embodiment, mobile device 310 can have a series of heat detectors located at various points near the surface of mobile device 310. It should be noted that, as used herein, the phrase "near the surface" can mean at or on the surface as well as below the surface, as some detectors may be incorporated into the cover layer of the mobile device. Because the purpose of the heat detectors 314 and 316 is to collect heat information that can be used to determine whether a human profile is indicated (i.e., whether a human is likely available via the mobile device 310), the heat detectors 314 and 316 are generally configured to obtain temperature data corresponding to a set of predictable situations that would result in a determination that a human profile is indicated.

A user of mobile device 310 will likely be available via mobile device 310 if the user is in close proximity to mobile device 310, and heat detectors 314 and 316 should be configured such that they can collect information that would indicate that situation. For example, the user may have mobile device 310 in a pocket, in which case one side of mobile device 310 would be closer to the user's body than the other side. Similarly, if a user is making a phone call, one side of mobile device 310 often will be pressed against the side of the user's head, while a portion of the opposite side of mobile device 310 may be cupped in the user's hand. As another example, a user may be interacting with mobile device 310 using a touch-screen or keypad, in which case, one side of mobile device 310 generally will be cupped in the user's hand, while the opposite side is facing up toward the user's face. From the foregoing exemplary situations, it is evident that when a user is interacting with mobile device 310 or when a user has mobile device 310 "on them," one side of mobile device 310 generally will be exposed to a greater amount of heat than the opposite side. Further, those of ordinary skill in the art will recognize that a majority of mobile devices are designed having two, parallel opposed flat surfaces or faces and four narrower sides oriented roughly perpendicular to the flat faces.

Figure 5:
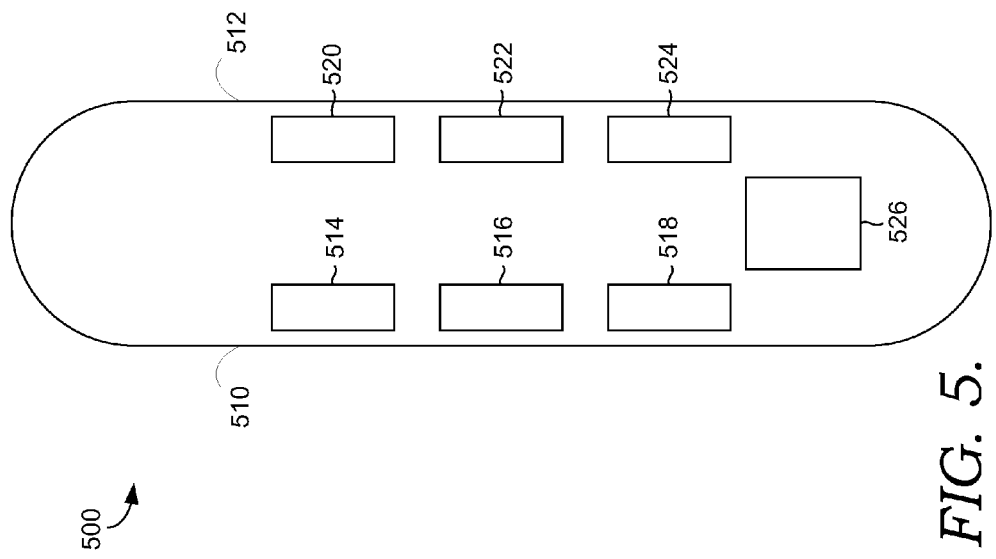
FIGS. 4-5 depict side views of exemplary mobile communications devices having internal heat and motion sensors in accordance with embodiments of the present invention.
Figure 4:
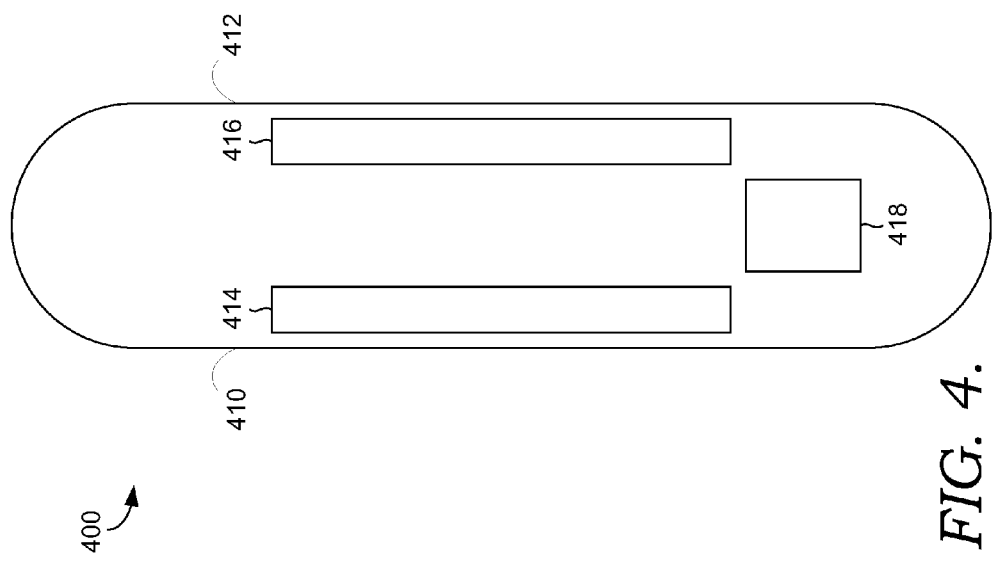

Turning briefly to FIGS. 4 and 5, side views of two different mobile devices 400 and 500 are illustrated and show exemplary configurations according to embodiments of the present invention. In FIG. 4, mobile device 400 is illustrated as having a first heat detector 414 positioned near the surface of a first flat surface 410 and a second heat detector 416 positioned near the surface of a second flat surface 412. This way, heat detector 414 can obtain a measurement of temperature associated with a location near the first surface 410 and heat detector 416 can obtain a measurement of temperature associated with a location near the second surface 412. Useful presence information can be derived from the difference between the two temperature measurements.

Another exemplary embodiment is illustrated in FIG. 5. FIG. 5 depicts a mobile device 500 having three heat detectors 514, 516, and 518 positioned near the surface of a first flat surface 510 and three heat detectors 520, 522, and 524 positioned near the surface of the opposite flat surface 512. As with the exemplary configuration illustrated in FIG. 4, useful presence information can be obtained from the difference between two or more temperature measurements as collected by the heat detectors 514, 516, 518, 520, 522, and 524 of FIG. 5. According to embodiments, temperature differences can be calculated between any two heat detectors 514, 516, 518, 520, 522, and 524, including between two heat detectors positioned near the same surface of the device 500. This latter example can be useful in a case such as, for example, where a user is engaged in a phone call using the mobile device 500, where the user's head is contacting one surface 510 of the device 500 and the user's hand is contacting the opposite side 512 of the device 500. Although there is likely, in that situation, to be heat transferred to both surfaces 510 and 512 of the device 500, different locations near the same surface 510 or 512 of the device 500 may have varying degrees of contact with the user's body, in which case varying levels of heat may be transferred to the surface 510 or 512 of the device 500, causing measurable temperature differences between the two locations. The embodiments illustrated in FIGS. 4 and 5 are not intended to limit the possible configurations that can be implemented according to embodiments of the present invention. It will be appreciated by those skilled in the art that there are numerous such configurations that could be implemented, and all of these configurations are considered to be within the ambit of the present invention.

Returning now to FIG. 3, mobile device 310 includes heat analysis component 318 that receives temperature data from heat detectors 314 and 316. Heat analysis component 318 calculates a difference between temperature measurements from heat detectors 314 and 316. According to various embodiments, heat detectors 314 and 316 can provide temperature measurements to heat analysis component 318 in a nearly continuous fashion, i.e. repeated measurements in rapid succession. In other embodiments, heat detectors 314 and 316 provide temperature measurements to heat analysis component 318 periodically, and in still further embodiments, heat detectors 314 and 316 provide temperature measurements to heat analysis component 318 upon receiving a request, instruction, or command to do so. The request, instruction, or command can be received from heat analysis component 318, presence analysis component 326, presence client 328 or some other component not illustrated in FIG. 3.

Heat analysis component 318 can store temperature difference data in a storage module 320 for some predetermined amount of time. For example, in some embodiments, heat analysis component 318 can be configured to calculate a series of temperature differences, storing each of, or selected ones of them, in storage module 320. In addition to determining temperature differences, heat analysis component can perform other types of analysis upon heat information (e.g., temperature data) received from heat detectors 314 and 316. For example, in some embodiments, heat analysis component 318 generates models that represent temperature differences as a function of time. It will be appreciated by those of ordinary skill in the art that various types of mathematical models may be used to describe heat information such as, for example, probability distributions, linear time series estimations, interpolations, and the like.

In some cases, mathematical models that represent heat information trends or behaviors over time, either short or long periods of time, can be useful in isolating useful data from the heat information. As used herein, a temperature difference having a component characteristic that suggests that the temperature difference is caused by something other than close proximity of a human being to mobile device 310 is referred to as a background profile. For instance, batteries of the type often used in mobile devices typically radiate energy in the form of heat. In some embodiments, the heat radiating from the battery may not be directed away from one or more of the heat detectors 314 and 316, and therefore could generate a background profile that results in false presence information that indicates a human profile when a human profile should not be indicated. Accordingly, heat analysis component 318 can isolate the components of the heat information received from heat detectors 314 and 316 that corresponds to the heat from the battery, and forward the remaining components of the heat information to presence analysis component 326. Generating models representing heat information can be useful in this way by allowing for the use of known techniques of isolating components of that type of information.

For example, in an embodiment, heat analysis component 318 can be informed of a heat signature that corresponds to the battery. Often, a battery's heat signature can be known or predicted based on data obtained from the battery's manufacturer. This information can be programmed into heat analysis component 318 so that it can be simply subtracted or otherwise removed from the heat information. In other embodiments, heat analysis component 318 can learn a heat signature, or how to predict or estimate, a heat signature corresponding to the battery. In still further embodiments, heat analysis component 318 can identify patterns in the heat information, and by subjecting the patterns to a set of rules or heuristics, can determine components of the heat information that are most likely attributable to the battery. As with the battery, similar considerations associated with other sources of heat can be addressed by heat analysis component 318. Thus, for example, if a mobile device is left outside in the sun, the consequential heat information can be appropriately interpreted to remove, or at least mitigate, the influence of the data generated by the sun.

Once heat information is processed by heat analysis component 318, the processed heat information, which can be referred to as presence information because it can be used to determine a presence status associated with a user of mobile device 310. The presence information is provided to presence analysis component 326, which references the presence information, and thus, the heat information when determining whether a human profile is indicated. A human profile can be indicated when a characterization of the heat information suggests that a human being is in close proximity to mobile device 310, and thus, that that the user likely is available via mobile device 310. Because other sources of heat can produce temperature differences measurable by the heat detectors 314 and 316, a predetermined range corresponding to the magnitudes of temperature differences that are likely to be generated by body heat from a human being may be utilized. Put another way, a human profile may be indicated if a temperature difference has a magnitude that is greater than a first threshold but lower than a second threshold. Again, the predetermined range can be programmed into presence analysis module 318 or, in other embodiments, can be established during a training period.

According to some embodiments of the present invention, presence analysis component 326 can receive models or other characterizations of heat information and can perform analysis thereon to determine whether a human profile is indicated. In one embodiment, for example, presence analysis component 326 is adapted to analyze heat information according to statistical techniques. For example, determining whether a human profile is indicated by heat information can include identifying a confidence interval surrounding a proposition that close proximity of a human being would generate a particular set of temperature data. Additional variables can be factored into the analysis as well, such as the probability that a user who is in close proximity to the user's mobile device is actually available via the mobile device, particular behavioral patterns associated with the user, the status of other functions associated with mobile device, motion information, and the like.

With continued reference to FIG. 3, mobile device 310 also includes an accelerometer 322. In various embodiments, mobile device 310 can include several accelerometers 322. In some embodiments, mobile device 310 includes only one accelerometer 322. Turning briefly to FIGS. 4 and 5, each of mobile devices 400 and 500 includes an accelerometer 418 and 526, respectively. The positioning of accelerometer 418 or 526 within the mobile device 400 is not generally limited to any particular configuration, and any such configuration is considered to be within the ambit of the present invention.

Returning again to FIG. 3, accelerometer 322 collects motion information. In embodiments, motion information includes measurements of acceleration associated with mobile device 310. In other embodiments, motion information comprises a characterization of a set of measurements of acceleration such as a model, an interpolation, and the like. As with heat information, motion information can be collected periodically, continuously, or in response to a request, instruction, or command. Additionally, as with heat information, other sources of motion can contribute to noisy motion information that yields inaccurate presence determinations, and therefore techniques such as those discussed above can be used to separate environmental motion information from motion information that is likely to have been generated by a human being.

In an embodiment, noise reduction techniques such as those used to eliminate white noise from audio or video signals can be used to filter environmental accelerations. Additionally, other techniques such as statistical modeling, principal component analysis, feature extraction, and the like can be used to isolate useful motion information. According to one embodiment, for example, a baseline characterization or component of motion information can be determined for a given amount of time (e.g., 10 seconds). The motion information can be analyzed to detect deviations from the baseline. In some embodiments, threshold deviation values can be established and, therefore, deviations that exceed a threshold or fall within a particular threshold range may indicate a human profile. While processing motion information from accelerometer 322, motion analysis component 324 can store motion information and/or processed motion information in storage module 325.

To maximize efficient use of storage space and time, in one embodiment, motion analysis component 324 may perform the baseline-deviation techniques, modeling techniques, or other techniques described above for predetermined periods of time such as, for example 10 or 15 seconds. When the predetermined time period expires, motion analysis component 324 can delete old data to free storage space for a new set of data. In other embodiments, motion analysis component 324 can generate a repeatedly updating characterization of motion information, and in further embodiments, motion analysis component 324 can generate characterizations of motion information that correspond with a single instance of temperature measurements. Many other techniques known to those of ordinary skill in the art can be utilized to process motion information, and all of those are considered to be within the ambit of the present invention.

Presence analysis component 326 determines whether a human profile is indicated. The output of this determination can be binary, in that it may be characterized by either a "yes" or a "no." In other embodiments, the output of the determination can include a confidence interval, mathematical model, or some other characterization of the processed heat and motion information. In all of these cases, the output can be referred to as presence information, which is provided to various clients 328 and 330 on mobile device 310. In some instances, presence analysis component 326 actually determines presence status, and provides that presence status information to various clients 328 and 330 on mobile device 310. Some clients on mobile device 310 can use presence status information in various ways such as, for example, by invoking some functionality or application based on presence status, by allowing for some types of operations based on presence status, and the like. One such client is a presence client 328, which is capable of interacting with presence server 312.

Presence client 328 communicates presence information or presence status information to presence server 312. In an embodiment, presence server 312 aggregates information received from presence client 328 with information received from other sources to generate presence status information. Presence information communicated by presence client 328 can be presence status information, and in some embodiments, that presence status information may be augmented, modified, or updated by presence server 312, which may reference presence information available from additional sources such as, for example, information source 224 illustrated in FIG. 2. According to various embodiments of the present invention, other clients 330 can also utilize or reference presence information or presence status information for triggering various processes, for identifying environmental characteristics, and the like.

Figures 6, 7:
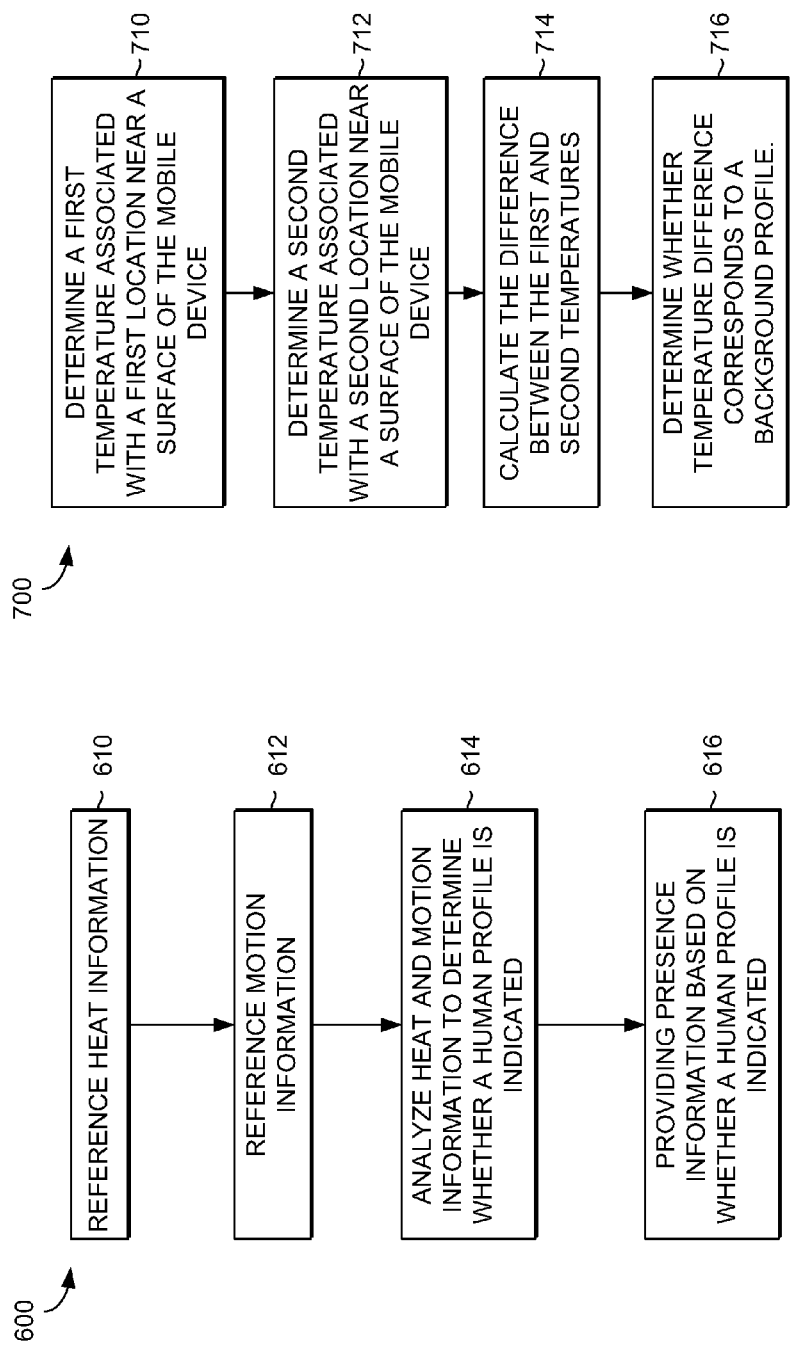
FIGS. 6-7 depict illustrative methods of determining presence information using heat data captured by sensors positioned within a mobile communications device.

To recapitulate, we have described systems and methods for providing presence information associated with a user of a mobile communications device using heat and motion data captured by sensors positioned within the mobile communications device. Turning now to FIG. 6, a flow diagram is shown that illustrates an exemplary method of determining presence information using heat data captured by sensors positioned within a mobile communications device. At a first illustrative step 610, heat information collected by a heat detector or heat detectors positioned within the mobile device is referenced. Referencing heat information can include receiving temperature difference data from a heat analysis component that analyzes temperature measurements collected by the heat detector(s). In other embodiments, referencing heat information includes receiving temperature measurements from the heat detector(s). In still further embodiments, referencing heat information can include receiving an indication of the probability that a given set of temperature measurements corresponds to a human profile.

At step 612, motion information is referenced. Motion information can include, for example, a series of accelerations associated with the mobile device. As shown in FIG. 6, the heat and motion information are analyzed, at step 614, to determine whether a human profile is indicated. At a final illustrative step, step 618, presence information is provided to a presence server, mobile device, device client, or other entity.

Turning to FIG. 7, another flow chart is shown that illustrates an exemplary method of determining presence information using heat information captured by sensors positioned within a mobile communications device. At step 710, the exemplary method includes determining a first temperature associated with a first location near a surface of the mobile device. In embodiments, the first location can be anywhere associated with a larger flat side (e.g., face) of the mobile device. The exemplary method further includes determining a second temperature associated with a second location near the surface of the mobile device, as indicated at step 712. In an embodiment, the second location can correspond to an opposite side of the mobile device from the first location. In another embodiment, the second location can simply be a different location corresponding to the first surface. At step 714, the difference between the first and second temperatures is calculated, and at a final illustrative step, step 716, a determination is made whether the temperature difference corresponds to a background profile or a human profile.

Figure 8:
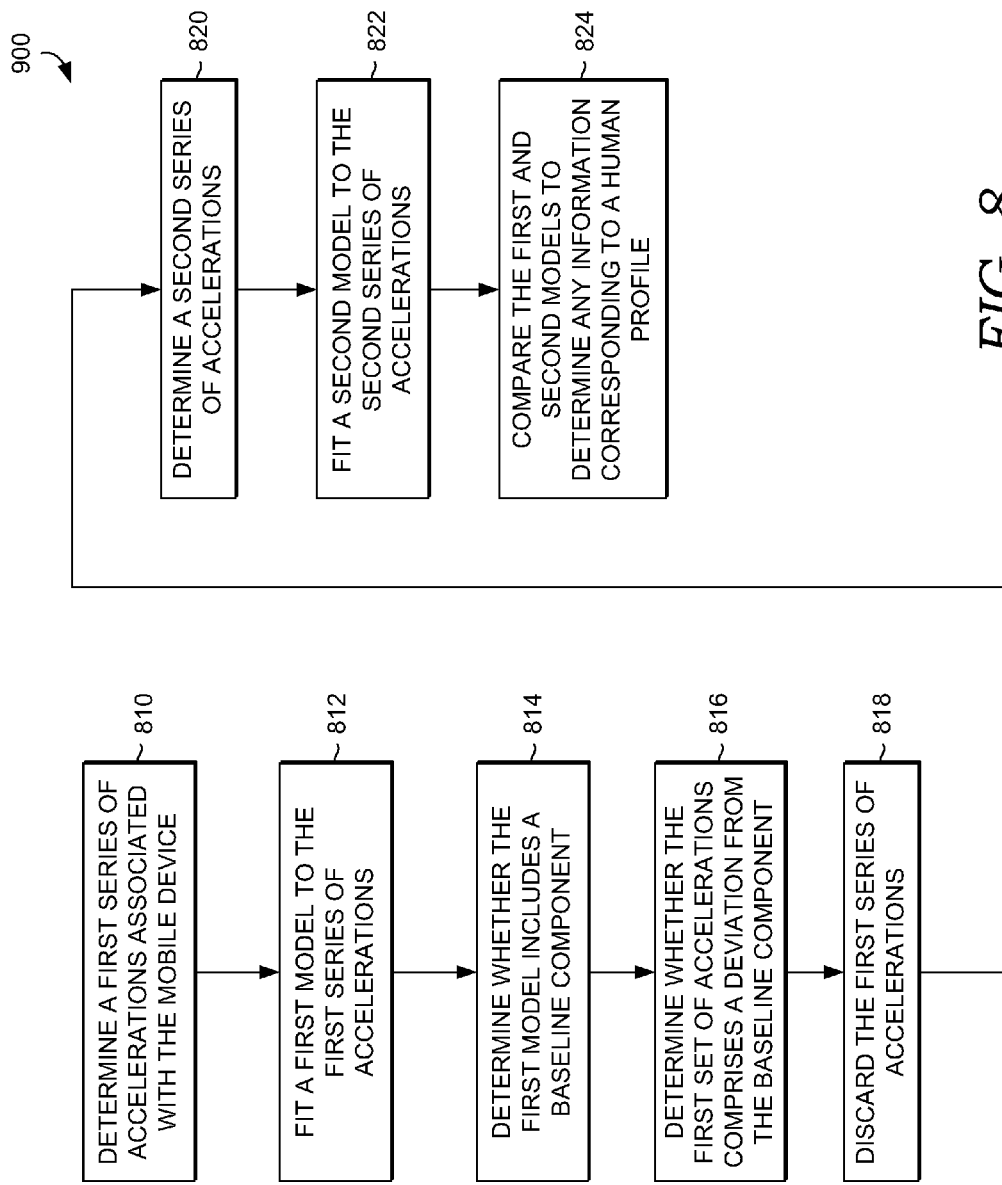
FIG. 8 depicts an illustrative method of determining presence information using motion data captured by a sensor positioned within a mobile communications device.

Referring to FIG. 8, a flow diagram is shown that illustrates an exemplary method of determining presence information using motion data captured by a sensor positioned within a mobile communications device. At a first illustrative step 810, a first series of accelerations associated with the mobile device is determined. A first model is fit to the first series of accelerations, as shown at step 812. Next, at step 814, a determination is made whether the first model includes a baseline component. Having identified a baseline component, a determination is then made whether the first set of accelerations includes a deviation from the baseline component. As shown at step 818 in FIG. 8, the first series of accelerations is discarded and, at step 820, a second series of accelerations is determined. A second model is fit to the second series of accelerations, as indicated by step 822, and at a final illustrative step, step 824, the first and second models are compared to determine whether any information exists that corresponds to a human profile.

Figure 9:
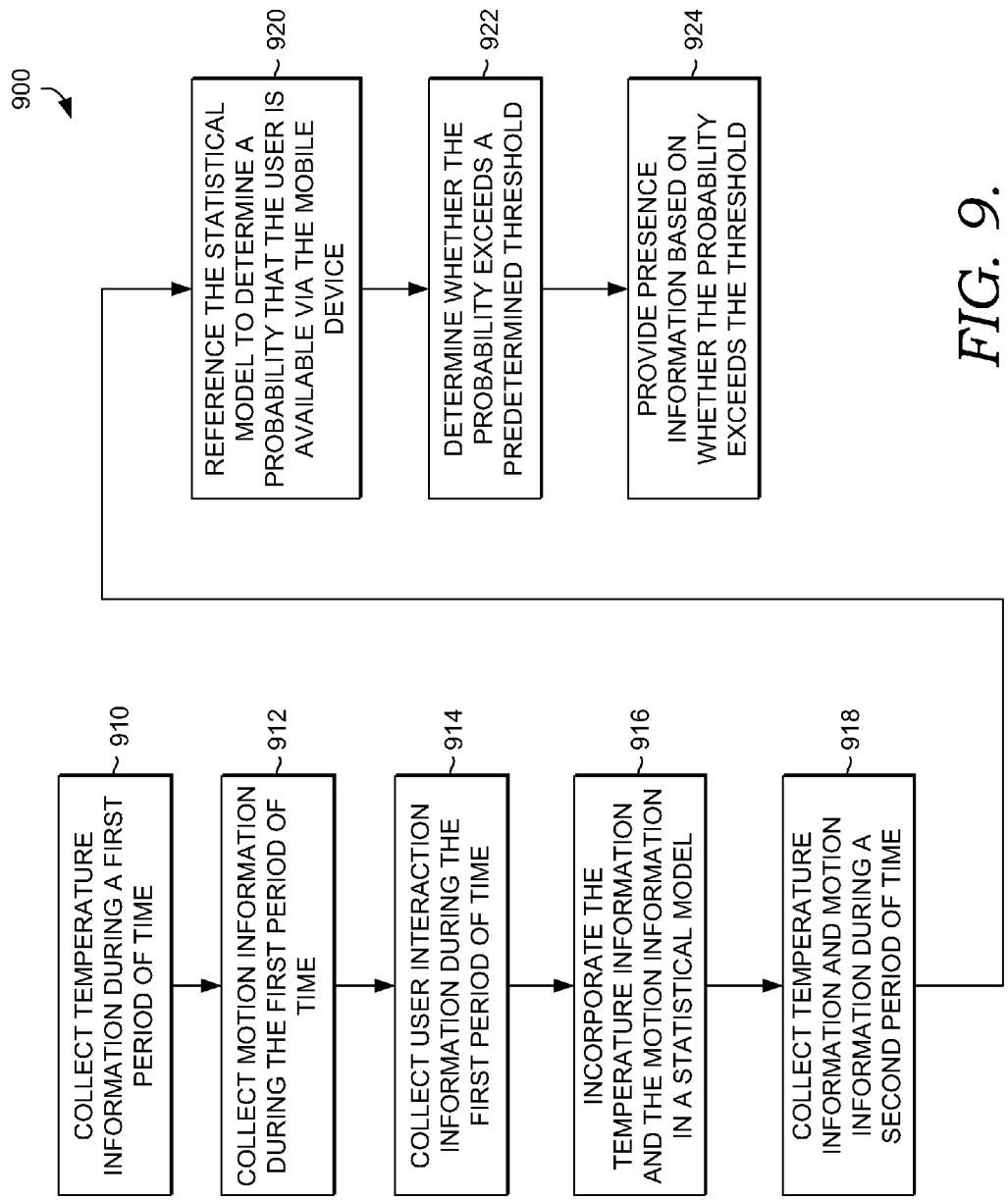
FIG. 9 depicts an illustrative method of determining presence information using heat and motion data captured by sensors positioned within a mobile communications device.

Turning to FIG. 9, a flow diagram is shown that illustrates an exemplary method of determining presence information using heat and motion data captured by sensors positioned within a mobile communications device. At a first illustrative step 910, heat information is collected during a first period of time and at step 912, motion information is also collected during the first period of time. At step 914, user interaction information is collected during the first period of time. User interaction information, as used herein, is information generated as a result of a user's direct interaction with the mobile device. This type of information is useful to validate estimated or predicted information based on the models that are fit to the data.

At step 916, the heat information and motion information is incorporated into a statistical model. Heat information and motion information is then collected during a second period of time, as shown at step 918. At step 920, the statistical model is referenced to determine that probability that the user is available via the mobile device. At step 922, the probability is compared against a predetermined threshold to determine whether the threshold is exceeded. At a final illustrative step, step 924, presence information is provided based on whether the probability threshold was exceeded. As discussed above, presence information can be provided to various types of clients on the mobile device, to a presence server or other network element, or to another mobile device. It should be understood that presence information can be used in many different ways and that all of these are considered to be within the scope of the present disclosure.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. For instance, in some embodiments, a mobile device may include heat detectors but not an accelerometer and in other embodiments, a mobile device may include accelerometers but not heat detectors. In still further embodiments, a mobile device can include other types of sensors or modules that process data to determine presence information. Additionally, in some embodiments, heat analysis and motion analysis can be performed within a single module, by a server on a network, or the like.

Further, not all steps listed in the various figures need be carried out in the specific order described. For instance, motion and heat analysis may be performed simultaneously or in any order desired. In some embodiments, presence information may be provided in iterations between types of analysis. In further embodiments, raw data collected from heat detectors and accelerometers can be streamed to a server or other module for analysis while other exemplary steps are being performed.

The invention claimed is:

1. A presence server for providing presence information associated with a user of a mobile communications device, the presence server comprising:
    one or more processing devices;
    one or more computer-readable media, having embodied thereon computer-useable instructions that, when executed, cause the presence server to:
    receive heat information associated with a first mobile device;
    receive motion information associated with the first mobile device;
    analyze the heat and motion information to determine whether a human profile is indicated, wherein the human profile comprises a characterization of heat and motion information that indicates that the user is available via the first mobile device; and
    store presence status information based on whether a human profile is indicated.

2. The presence server of claim 1, wherein the presence server is further configured to communicate the presence status information to a second mobile device.

3. The presence server of claim 1, wherein the heat information comprises a temperature difference value, wherein a temperature difference value comprises a difference between at least two temperatures.

4. The presence server of claim 3, wherein the presence server is further configured to:
    determine a first temperature associated with a first location near a surface of the first mobile communications device;
    determine a second temperature associated with a second location near a surface of the first mobile communications device; and
    calculate the temperature difference between the first and second temperatures.

5. The presence server of claim 4, wherein the presence server is further configured to determine whether the temperature difference corresponds to a background profile, wherein the background profile comprises a particular temperature difference having a component characteristic that suggests whether the temperature difference is caused by something other than close proximity of a human being to the first mobile communications device.

6. The presence server of claim 5, wherein the background profile is associated with a temperature difference component having a characteristic that suggests that the cause of the temperature difference is a battery disposed within the first mobile device.

7. The presence server of claim 1, wherein the presence server is further configured to:
    determine a first series of accelerations associated with the first mobile device; and
    fit a first model to the first series of accelerations.

8. The presence server of claim 7, wherein the presence server is further configured to:

discard the first series of accelerations, wherein the first model is temporarily maintained for comparing with a second mathematical model;

determine a second series of accelerations associated with the first mobile device;

fit a second model to the second series of accelerations;

compare the first model with the second model to identify information about both models that corresponds to a human profile; and discard the first model.

9. One or more computer-readable media having computer-executable instructions embodied thereon for performing a method of providing presence information associated with a user of a first mobile communications device, the method comprising:

at a network element, receiving a first temperature associated with a first location near an outside surface of the first mobile communications device;

at the network element, receiving a second temperature associated with a second location near an outside surface of the first mobile communications device;

calculating a difference between the first temperature and the second temperature;

comparing the difference to a predetermined range that corresponds to a human profile, wherein the human profile comprises a range of temperature differences that suggest that a human being is in close proximity to the first mobile communications device; and when the difference is within the predetermined range, storing presence status information that indicates that the user is available via the first mobile communications device.

10. The media of claim 9, the method further comprising communicating the presence status information to a second mobile communications device.

11. The media of claim 10, the method further comprising referencing motion information associated with the first mobile communications device.

12. The media of claim 11, the method further comprising determining whether the motion information corresponds to a human profile.

13. The media of claim 12, the method further comprising referencing one or more additional sources of presence information.

14. A presence server that provides presence information associated with a user of a mobile communications device ("mobile device"), wherein the presence server is configured to:

receive acceleration data associated with the mobile device;

analyze the acceleration data to determine whether a human profile is indicated, wherein the human profile comprises a characterization of motion information that indicates that the user is available via the mobile device, and wherein the presence server is configured to
 (1) fit a model to at least a portion of the acceleration data,
 (2) determine whether the model includes a baseline component, and
 (3) determine whether the first set of accelerations includes a deviation from the baseline component; and store presence status information that is based at least on whether the human profile is indicated.

15. The presence server of claim 14, wherein the presence server is further configured to communicate presence status information to a second mobile communications device.

16. The presence server of claim 14, wherein the acceleration is analyzed to produce motion information.

17. The presence server of claim 14, wherein a determination of whether a human profile is indicated includes a determination of whether the deviation from the baseline component exceeds a threshold or falls within a threshold range.

18. The presence server of claim 14, wherein the presence server is further configured to receive user interaction information from a period of time when the acceleration data was collected, wherein the user interaction data includes information generated as a result of the user's direct interaction with the mobile device.

19. The presence server of claim 18, wherein the presence server is further configured to utilize the user interaction data to validate estimated or predicted information based on the model that is fit to at least the portion of the acceleration data.

20. The presence server of claim 18, wherein fitting the model to at least the portion of the acceleration data includes utilizing the user interaction data to validate estimated or predicted information based on the model that is fit to at least the portion of the acceleration data.

* * * * *